United States Patent
Okachi et al.

(10) Patent No.: US 7,790,309 B2
(45) Date of Patent: Sep. 7, 2010

(54) BATTERY PACK

(75) Inventors: Satoshi Okachi, Tokyo (JP); Tomoaki Watanabe, Nagano (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/970,951

(22) Filed: Oct. 22, 2004

(65) Prior Publication Data

US 2005/0118463 A1    Jun. 2, 2005

(30) Foreign Application Priority Data

Oct. 24, 2003   (JP) ............................. 2003-364606
Nov. 11, 2003   (JP) ............................. 2003-381121

(51) Int. Cl.
    *H01M 2/14*    (2006.01)
(52) U.S. Cl. ........................... 429/129; 429/7; 429/239
(58) Field of Classification Search ................ 429/129, 429/143, 123, 239
    See application file for complete search history.

(56) References Cited

U.S. PATENT DOCUMENTS

| | | | | |
|---|---|---|---|---|
| 4,920,019 A * | 4/1990 | Stoklosa et al. | ............. | 429/122 |
| 6,303,248 B1 * | 10/2001 | Peterson | .................... | 429/177 |
| 6,432,575 B1 * | 8/2002 | Yamagami | .................. | 429/100 |
| 6,583,600 B2 * | 6/2003 | Haga et al. | .................. | 320/110 |
| 2002/0061436 A1 * | 5/2002 | Inagaki et al. | ............... | 429/120 |
| 2002/0182480 A1 * | 12/2002 | Hanauer et al. | ............... | 429/62 |
| 2003/0139220 A1 * | 7/2003 | Duquette et al. | ............ | 473/131 |
| 2003/0146734 A1 * | 8/2003 | Kozu et al. | ................... | 320/107 |
| 2003/0211382 A1 * | 11/2003 | Aoyama | ...................... | 429/96 |
| 2003/0227272 A1 * | 12/2003 | Hsu et al. | .................... | 318/471 |
| 2003/0227275 A1 * | 12/2003 | Kishi et al. | ................. | 320/107 |

FOREIGN PATENT DOCUMENTS

| | | |
|---|---|---|
| JP | H11-195407 | 7/1999 |
| JP | 2000-90898 | 3/2000 |
| JP | 2002-124221 | 4/2002 |

* cited by examiner

*Primary Examiner*—Patrick Ryan
*Assistant Examiner*—Ben Lewis
(74) *Attorney, Agent, or Firm*—Oblon, Spivak, McClelland, Maier & Neustadt, L.L.P.

(57) ABSTRACT

A battery pack includes a casing formed of an insulative material; a secondary battery disposed inside the casing; a control circuit-board disposed inside the casing and provided for charging and discharging the secondary battery; and a protection sheet formed of an insulative material and disposed inside the casing while being in contact with an outer surface of the secondary battery. The control circuit-board is disposed across from the secondary battery while the protection sheet is disposed therebetween. The external dimension of the protection sheet is greater than the external dimension of the control circuit-board.

20 Claims, 12 Drawing Sheets

BATTERY PACK

BACKGROUND OF THE INVENTION

1. Field of the Invention

The present invention relates to battery packs, and particularly, to a battery pack which is provided with a protection sheet disposed between a secondary battery and a control circuit-board, and which achieves a compact structure without sacrificing the ability to prevent an electrolyte from adhering to the control circuit-board.

2. Description of the Related Art

A typical battery pack is installed in a main-body unit of an electronic apparatus, such as a personal computer, and drives the battery for the main-body unit.

Battery packs are generally provided with a casing in which a single secondary battery or a plurality of secondary batteries is disposed. Moreover, the casing also contains a control circuit-board for charging and discharging the secondary battery or secondary batteries. Lithium-ion batteries are widely used for the secondary batteries, and combustible organic solvents are generally used for the electrolyte contained in the battery cells.

If such secondary batteries are used in an environment where the temperature and the pressure are high, for example, there may be cases where the electrolyte leaks or evaporates from the interior of the battery cell depending on the contact between the positive terminal and the battery cylinder, i.e. the outer casing of the battery cell. This may be problematic if the electrolyte leaks or evaporates and thus adheres to the control circuit-board. This could lead to problems, such as a short circuit in the control circuit-board, dysfunction of electronic components on the control circuit board, or an insulation failure caused by a migration of a metallic material to an insulative material.

To solve such problems caused by the leakage or evaporation of an electrolyte, Japanese Unexamined Patent Application Publication No. 8-293327 discloses a battery pack including a casing in which a barrier wall is provided for separating the secondary batteries from the control circuit-board. Such a structure prevents the electrolyte from entering the control circuit-board.

According to such a conventional battery pack, however, the barrier wall inside the casing generally requires a thickness of about 1 mm for, for example, rigidity. For this reason, a predetermined space must be provided for the barrier wall. This is problematic in that it is difficult to make the battery pack sufficiently compact.

Furthermore, since the barrier wall is integrally disposed in the casing in most cases, if the thickness of the barrier wall is reduced to achieve a compact structure for the battery pack, the fluidity of the molding resin used for fabricating the casing becomes deteriorated. This may lead to higher manufacture costs for the battery pack since exact values may be required for the molding conditions, such as the molding temperature and injection speed.

Furthermore, since such a structure is complex due to having the barrier wall inside the casing, such a structure can lead to molding errors caused by, for example, weld marks and sink marks.

Moreover, if the battery pack receives an external impact due to, for example, dropping or vibration of the battery pack, the impact may transmit to the barrier wall and can thus cause the barrier wall to crack or break. This is problematic in that the electrolyte may enter the control circuit-board. Such a problem of the electrolyte entering the control circuit-board due to the cracking or breakage of the barrier wall is likely to occur especially in cases where the barrier wall is integrally disposed in the casing since the impact can easily transmit to the barrier wall.

SUMMARY OF THE INVENTION

Accordingly, it is an object of the present invention to provide a compact battery pack without sacrificing the ability to prevent an electrolyte from adhering to a control circuit-board.

A battery pack according to the present invention includes a casing formed of an insulative material; at least one secondary battery disposed inside the casing; a control circuit-board disposed inside the casing and provided for charging and discharging the secondary battery; and a protection sheet formed of an insulative material and disposed inside the casing while being in contact with an outer surface of the secondary battery. The control circuit-board is disposed across from the secondary battery while the protection sheet is disposed therebetween. The external dimension of the protection sheet is greater than the external dimension of the control circuit-board.

According to the battery pack of the present invention, the second battery and the control circuit-board are thus separated from each other by the protection sheet.

Accordingly, the protection sheet prevents the electrolyte, which can possibly leak from the secondary battery, from entering the control circuit-board. Thus, an additional barrier wall, which may be disposed between the secondary battery and the control circuit-board, for preventing a leaking electrolyte from entering the control circuit-board is not necessary. This contributes to the compactness of the battery pack without sacrificing the ability to prevent the electrolyte from adhering to the control circuit-board.

Furthermore, in comparison with conventional battery packs in which a barrier wall is required inside the casing, since the battery pack of the present invention does not require such barrier walls, the present invention provides simpler molding conditions for fabricating the casing. Moreover, the present invention prevents molding errors caused by, for example, weld marks and sink marks, as is often the case when a barrier wall is provided.

Furthermore, since a barrier wall is not integrally disposed in the casing, the battery pack is prevented from, for example, cracking and breaking of a barrier wall which may be caused by dropping or vibration of the battery pack. Accordingly, this ensures the prevention of the electrolyte from entering the control circuit-board.

Furthermore, the protection sheet may be rectangular, and may be disposed such that the longitudinal direction of the protection sheet is aligned with a longitudinal direction of the secondary battery. Moreover, at least two opposite edges of the protection sheet extending in the longitudinal direction of the protection sheet may each be provided with a sealant, one sealant blocking a space between one of the edges and an inner surface of the casing, the other sealant blocking a space between the other edge and the inner surface of the casing.

Furthermore, the sealants may comprise adhesives and attach the protection sheet, the secondary battery, and the inner surface of the casing together. Consequently, the electrolyte from the secondary battery is prevented from entering the control circuit-board, thus further preventing the electrolyte from adhering to the control circuit-board.

Furthermore, at least two opposite ends of the substantially-rectangular protection sheet with respect to the longitudinal direction may each be provided with an absorptive sheet for absorbing an electrolyte leaking from an interior of the secondary battery, the protection sheet being disposed such that the longitudinal direction of the protection sheet is aligned with the longitudinal direction of the secondary battery. Consequently, the electrolyte traveling towards the control circuit-board around the two opposite ends of the secondary battery is absorbed by the two absorptive sheets. This further prevents the electrolyte from adhering to the control circuit-board.

Furthermore, the casing may include a stopper rib for blocking an electrolyte leaking from the interior of the secondary battery so as to prevent the electrolyte from reaching the control circuit-board. Thus, the electrolyte leaking from the secondary battery is blocked by the stopper rib. Accordingly, this further prevents the electrolyte from adhering to the control circuit-board.

Furthermore, the protection sheet may include an insertion hole through which a tab extends, the tab connecting electrodes of the secondary battery with the control circuit-board. A space between the insertion hole and the tab may be blocked by a sealant. If the electrolyte leaks from the secondary battery, the electrolyte is prevented from reaching the control circuit-board via the insertion hole, meaning that the electrolyte is prevented from adhering to the control circuit-board.

Furthermore, the battery pack may further include a thermistor which is connected with the control circuit-board and detects the surface temperature of the secondary battery. The protection sheet may be formed of a thermal-conductive material, and the thermistor may be disposed between the control circuit-board and the protection sheet. Consequently, a designated space for the thermistor is not necessary. This contributes to the compactness of the battery pack without deteriorating the functionality of the thermistor.

Moreover, due to the high thermal-conductive material used for the protection sheet, designated holes for conducting heat from the secondary battery to the thermistor are not required in the protection sheet. Accordingly, this prevents the electrolyte, which can possibly leak from the secondary battery, from entering the control circuit-board.

Furthermore, an inner surface of the casing may be provided with at least one positioning rib which is in contact with one of the edges of the substantially-rectangular protection sheet extending in the longitudinal direction of the protection sheet such that the protection sheet is set at a predetermined position with respect to the casing, the protection sheet being disposed such that the longitudinal direction of the protection sheet is aligned with the longitudinal direction of the secondary battery. Since one of the edges of the protection sheet comes into contact with the positioning rib, the positioning of the secondary battery in the circumferential direction is performed with respect to the casing. This further improves the efficiency of the assembly process for the battery pack.

Furthermore, at least one secondary battery may include a plurality of secondary batteries which are connected in series and are disposed inside the casing, and at least one positioning rib may include a plurality of positioning ribs such that each positioning rib is set in a space between adjacent secondary batteries so as to set the secondary batteries at predetermined positions with respect to the casing. Consequently, the positioning of the secondary batteries can be performed with respect to the casing when the secondary batteries are set in the casing. Thus, the efficiency of the assembly process for the battery pack is further improved.

Furthermore, the battery pack is preferably capable of being installed in a battery holder which is provided in an electronic apparatus and has a guiding portion. Moreover, the battery pack may further include a guided portion which is guided by the guiding portion when the battery pack is engaged with the battery holder. Thus, the engagement of the battery pack to the battery holder can be smoothly and properly performed.

Furthermore, the battery pack is preferably capable of being installed in a battery holder which is provided in an electronic apparatus and has a locking portion. Moreover, the battery pack may further include a lock member which is locked in the locking portion when the battery pack is engaged with the battery holder. Consequently, the battery pack is prevented from falling off the battery holder.

DESCRIPTION OF THE PREFERRED EMBODIMENTS

Figure 1:
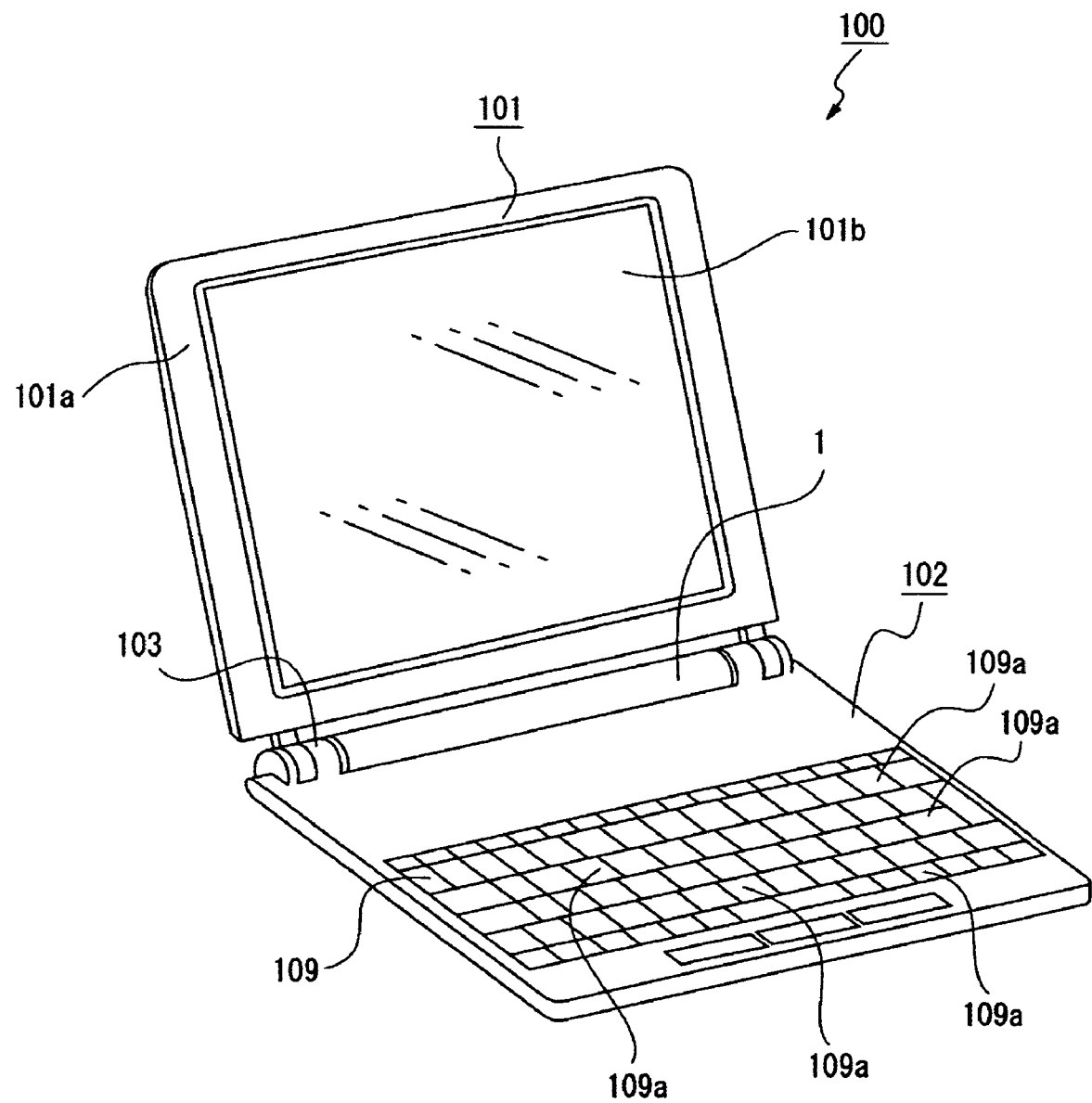
FIG. 1 is a perspective view of an electronic apparatus provided with a battery pack according to a preferred embodiment of the present invention.

A battery pack according to the present invention will now be described with reference to the attached drawings. A battery pack according to a preferred embodiment of the present invention is used in a personal computer. However, the technical scope of the present invention is not limited to a battery pack used in a personal computer, and may include battery packs used in other types of electronic apparatuses that are driven by a battery.

Referring to FIGS. 1, 2A, 2B, and 2C, the structure of an electronic apparatus 100, i.e. a personal computer, will first be described.

The electronic apparatus 100 includes a display unit 101 and a main-body unit 102.

The display unit 101 is provided with a display housing 101a and a display screen 101b mounted to the display housing 101a.

The display unit 101 is rotatably supported by the rear portion of the main-body unit 102 via hinges 103 provided at left and right ends of the rear portion. Here, the term "rear" will be defined as a side of the electronic apparatus 100 having the display unit 101, whereas the term "front" will be defined as a side of the electronic apparatus 100 without the display unit 101.

Figure 2A:
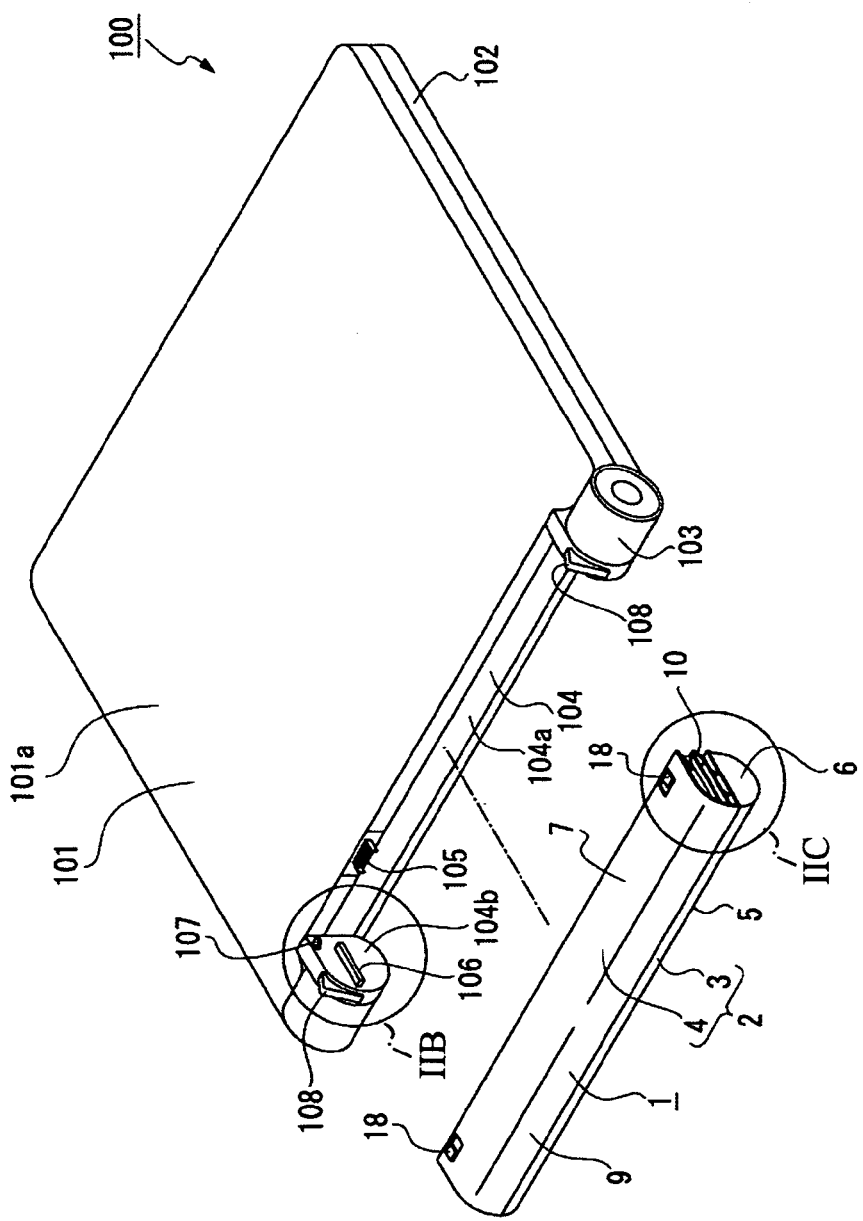
FIGS. 2A, 2B, and 2C are perspective views each illustrating a state where the battery pack is disengaged from a battery holder of the electronic apparatus according to the embodiment of the present invention.

Referring to FIG. 2A, a battery holder 104 for holding a battery pack, which will be described later, is provided between the hinges 103. The battery holder 104 has a recessed shape. In detail, the battery holder 104 has a longitudinal surface 104a extending from the left end to the right end of the battery holder 104 and facing towards the rear of the electronic apparatus 100, and two side surfaces 104b which extend respectively from left and right edges of the longitudinal surface 104a and which face each other.

The longitudinal surface 104a of the battery holder 104 is provided with a plug connector 105.

Figure 2B:
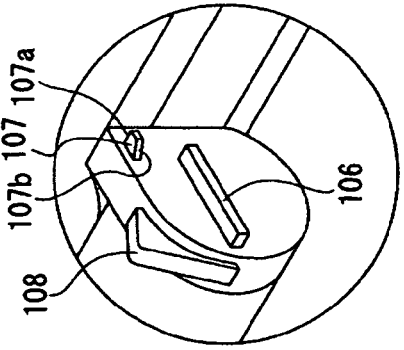

The two side surfaces 104b of the battery holder 104 are respectively provided with two guiding portions 106, only one of which being shown in FIG. 2B. The guiding portions 106 are projected towards each other from the respective side surfaces 104b and extend longitudinally with respect to the front and rear of the electronic apparatus 100.

Moreover, the two side surfaces 104b of the battery holder 104 are also respectively provided with two locking portions 107, only one of which being shown in FIG. 2B. The locking portions 107 are disposed above the corresponding guiding portions 106 and are projected towards each other from the corresponding side surfaces 104b. Each of the locking portions 107 has a stopper surface 107a facing towards the front of the electronic apparatus 100, and a sloping surface 107b which is disposed further towards the rear of the electronic apparatus 100 than the stopper surface 107a and is inclined towards the corresponding side surface 104b.

The main-body unit 102 is provided with two regulation protrusions 108 at the left and right ends of the battery holder 104, respectively. When the display unit 101 is opened by being rotated by a predetermined angle with respect to the main-body unit 102, the display unit 101 comes into contact with the regulation protrusions 108 such that the rotational angle of the display unit 101 is regulated by the regulation protrusions 108.

The regulation protrusions 108 may either be disposed on the main-body unit 102, as described above, or may be disposed on a casing 2 of a battery pack 1.

Referring to FIG. 1, the main-body unit 102 is provided with a keyboard 109 which is oblong sideways. The keyboard 109 has a plurality of predetermined keys 109a. The main-body unit 102 contains processing means, such as a central processing unit (CPU). The processing means performs a corresponding operation in response to a signal input via, for example, one of the keys 109a on the keyboard 109.

Referring to FIGS. 3 to 12, the battery pack 1 used in the electronic apparatus 100 will now be described in detail.

Figure 3:
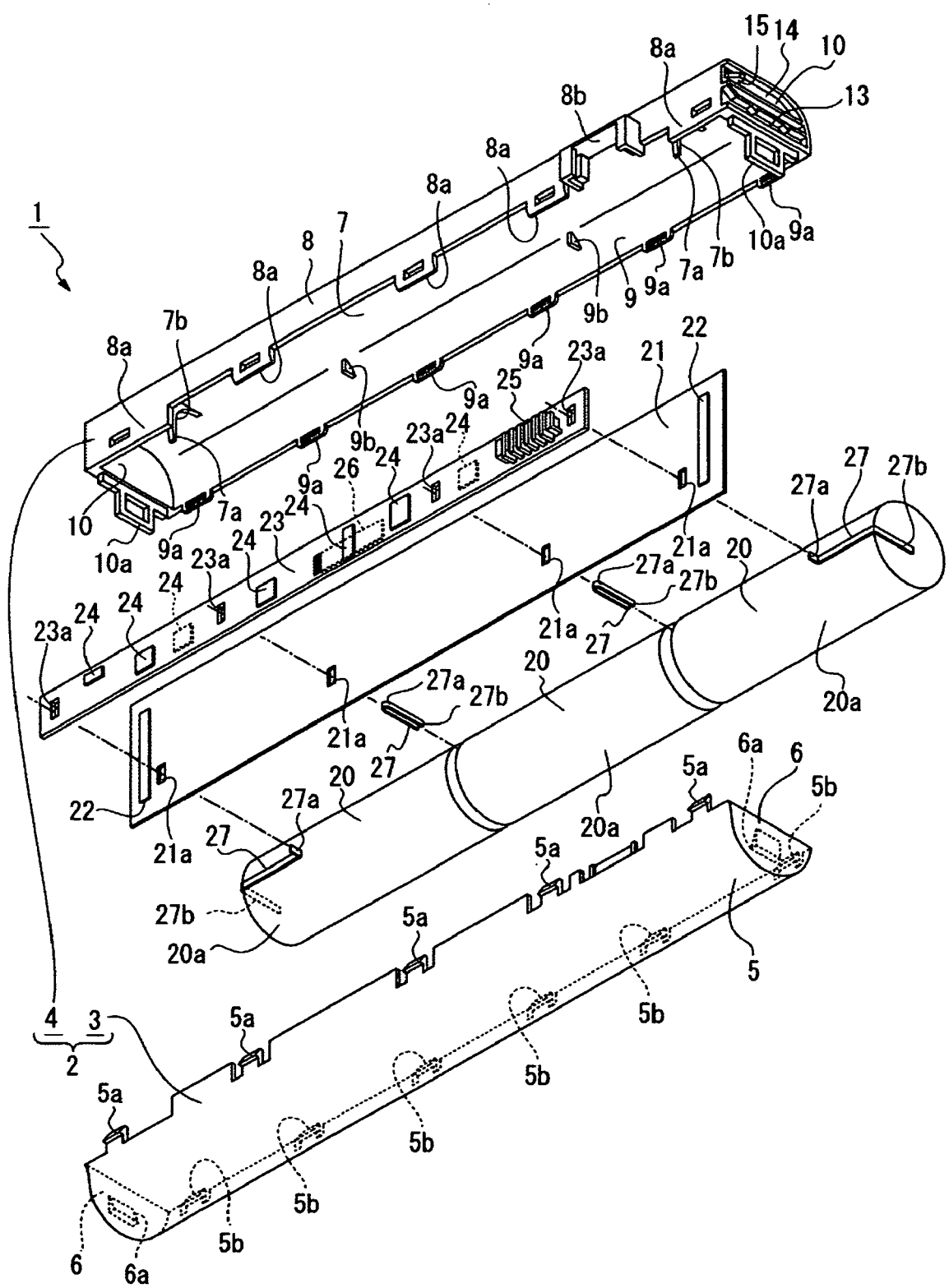
FIG. 3 is an exploded perspective view of the battery pack.
Figure 4:
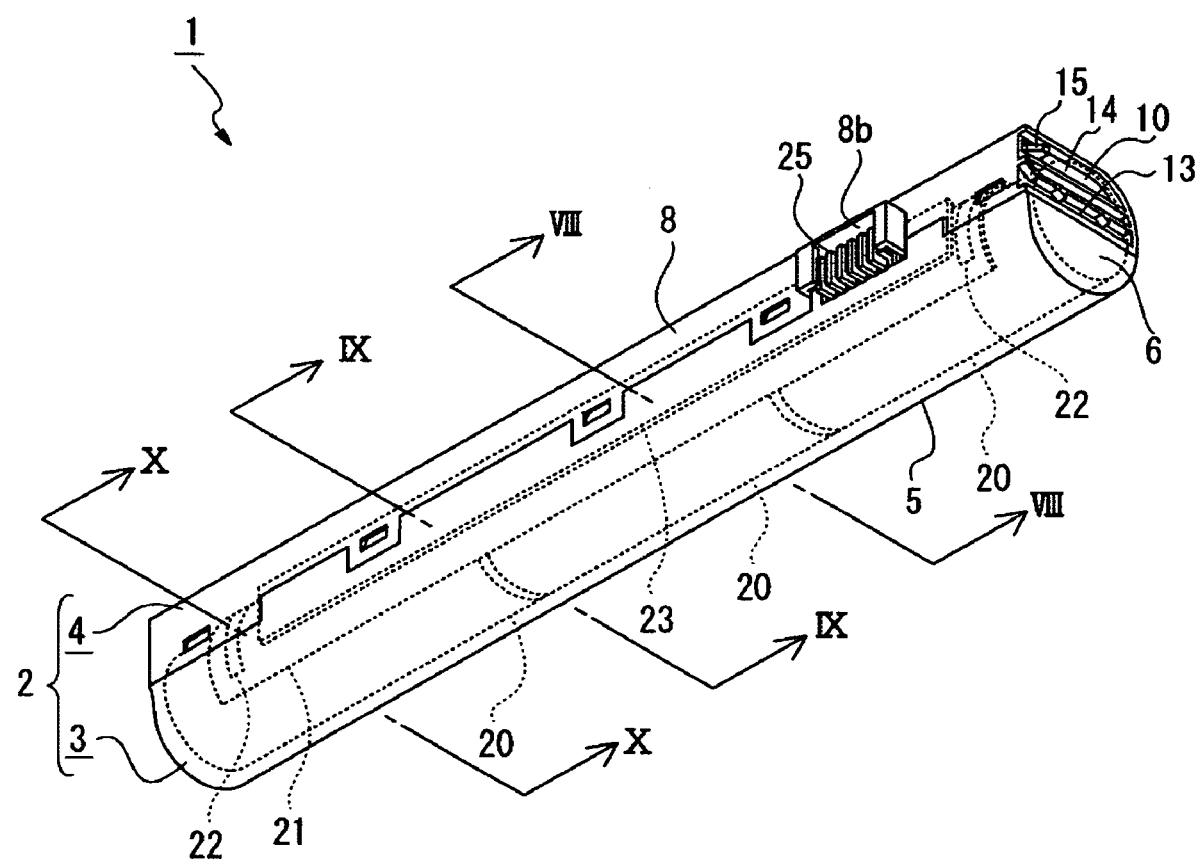
FIG. 4 is a perspective view of the battery pack.

Referring to FIGS. 3 and 4, the battery pack 1 includes multiple parts disposed at their predetermined positions inside the casing 2.

The casing 2 is formed of an insulative material, and includes a first casing component 3 and a second casing component 4 which are combined together.

The casing 2 is preferably formed of a material that is highly resistant against heat and drop impact, has a low density, is flame-retardant, and is electrolyte-endurable. Moreover, it is also preferable that the material used for the casing 2 has fluidity and can be molded to form a thin-walled structure. For example, the casing 2 is formed of a resin material such as an acrylonitrile-butadiene-styrene (ABS) resin or a polycarbonate (PC) resin.

The first casing component 3 has an elongated structure having an opening at the upper side. Specifically, the first casing component 3 has an arc surface 5 whose cross-section is substantially arc-shaped in the lateral direction of the first casing component 3 and which is elongated in the longitudinal direction; and two side surfaces 6 disposed respectively at left and right ends of the arc surface 5.

Figure 5:
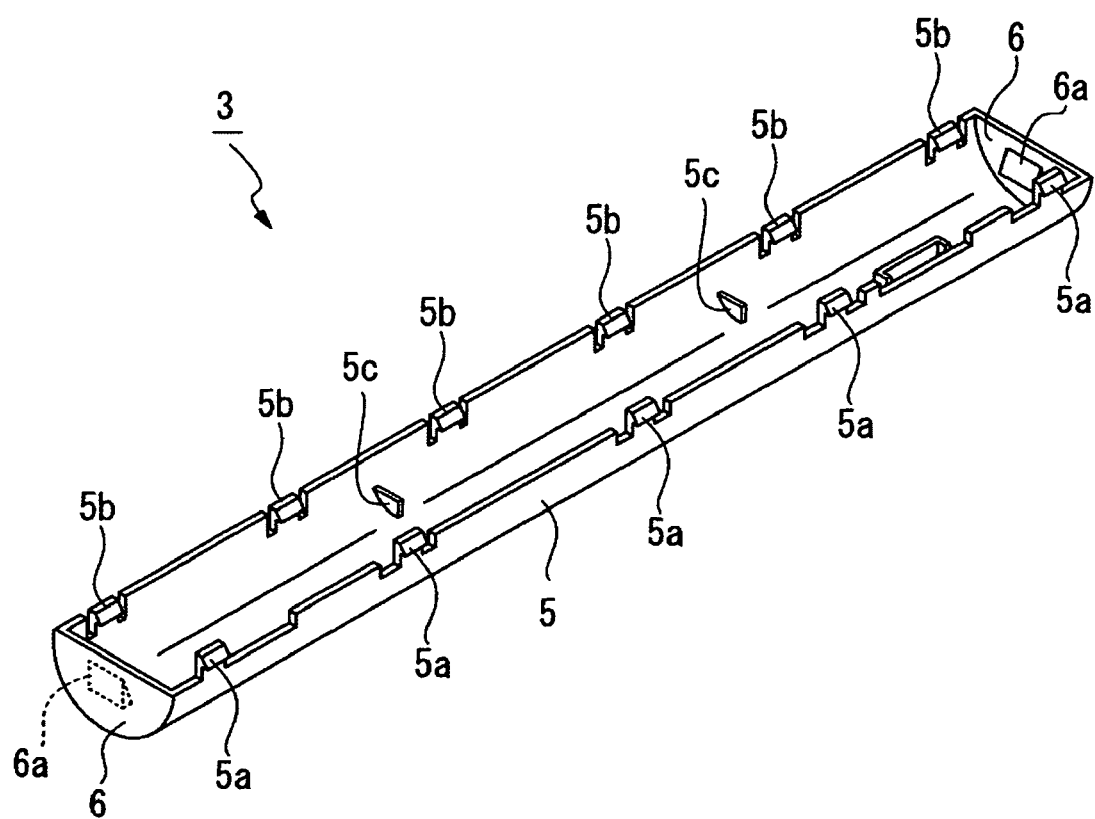
FIG. 5 is a perspective view of a first casing component.

Two opposite rims of the arc surface 5 extending in the longitudinal direction are respectively provided with a set of engagement tabs 5a and a set of engagement tabs 5b. Each of the engagement tabs 5a is projected upward and is provided with an engagement claw, and similarly, each engagement tab 5b is also projected upward and is provided with an engagement claw. Referring to FIG. 5, the inner side of the arc surface 5 is provided with positioning ribs 5c which are projected upward and are separated by a predetermined distance in the longitudinal direction.

The inner sides of the two side surfaces 6 are respectively provided with two engagement protrusions 6a.

Referring to FIG. 3, the second casing component 4 has an elongated box-shaped structure having an opening at the bottom side. Specifically, the second casing component 4 has an upper surface 7 extending in the longitudinal direction of the second casing component 4; a front surface 8 extending downward from the front edge of the upper surface 7; an arc surface 9 extending downward continuously from the rear edge of the upper surface 7; and two side surfaces 10 respectively extending downward from the left and right edges of the upper surface 7.

The inner side of the upper surface 7 is provided with two stopper ribs 7a disposed respectively at positions near the left and right ends of the second casing component 4. The stopper ribs 7a are projected downward. The front side of each stopper rib 7a is connected with the front surface 8, whereas the back side of each stopper rib 7a is provided with an arc segment 7b.

Figure 6:
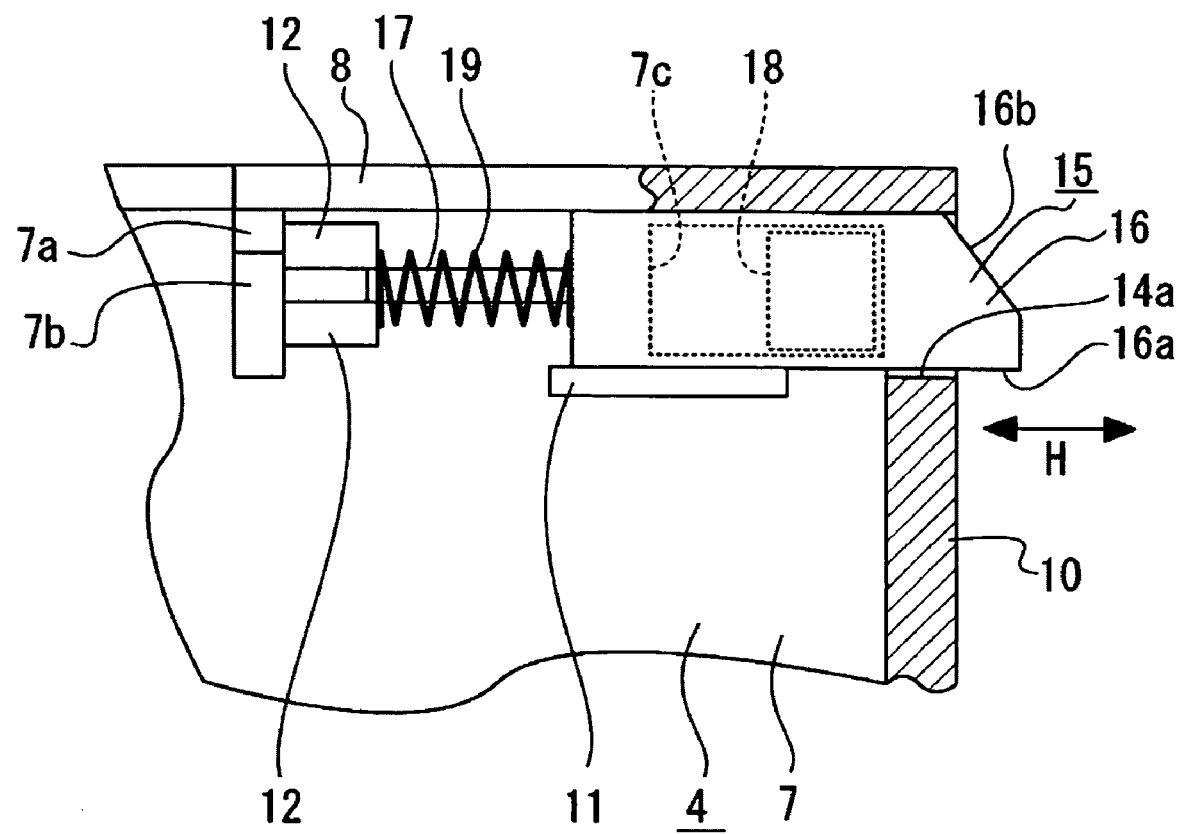
FIG. 6 is an enlarged bottom view illustrating the cross-section of one of lock members in a supported state.

Referring to FIG. 6, a pair of oblong holes 7c is respectively disposed adjacent to the left and right ends of the upper surface 7. Furthermore, a pair of guide protrusions 11 is respectively disposed adjacent to the left and right ends at the inner side of the upper surface 7. Each guide protrusion 11 is disposed behind the front surface 8, and each guide protrusion 11 and the front surface 8 are separated by a predetermined distance.

Furthermore, two sets of two supporting protrusions 12 are disposed on the inner side of the upper surface 7, each set being connected with the corresponding one of the stopper ribs 7a. The two supporting protrusions 12 in each set are parallel to each other in the longitudinal direction of the second casing component 4 and are separated by a predetermined distance. Moreover, each set of the supporting protrusions 12 is disposed between the corresponding stopper rib 7a and the corresponding guide protrusion 11.

Referring to FIG. 3, the bottom rim of the front surface 8 is provided with engagement tabs 8a which are projected downward and are separated by a predetermined distance in the longitudinal direction of the second casing component 4. Each of the engagement tabs 8a is provided with an engagement hole. A connector-opening 8b is disposed at a position near the right end of the front surface 8 in FIG. 3.

On the other hand, the bottom rim of the arc surface 9 is provided with engagement tabs 9a which are projected downward and are separated by a predetermined distance in the longitudinal direction of the second casing component 4. Each of the engagement tabs 9a is provided with an engagement hole. The inner side of the arc surface 9 is provided with positioning ribs 9b which are projected downward and are separated by a predetermined distance in the longitudinal direction of the second casing component 4.

The bottom rim of each side surface 10 is provided with an engagement tab 10a which is projected downward and has an engagement hole.

Figure 2C:
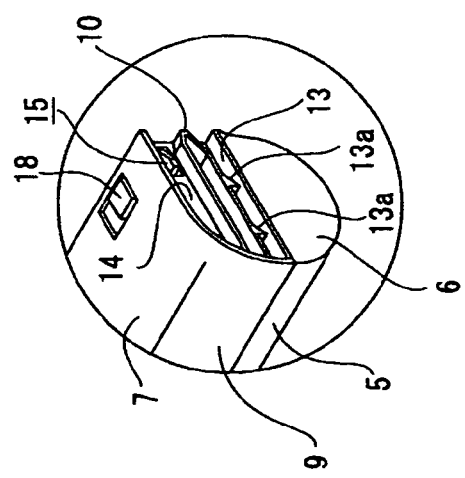
Figure 7:
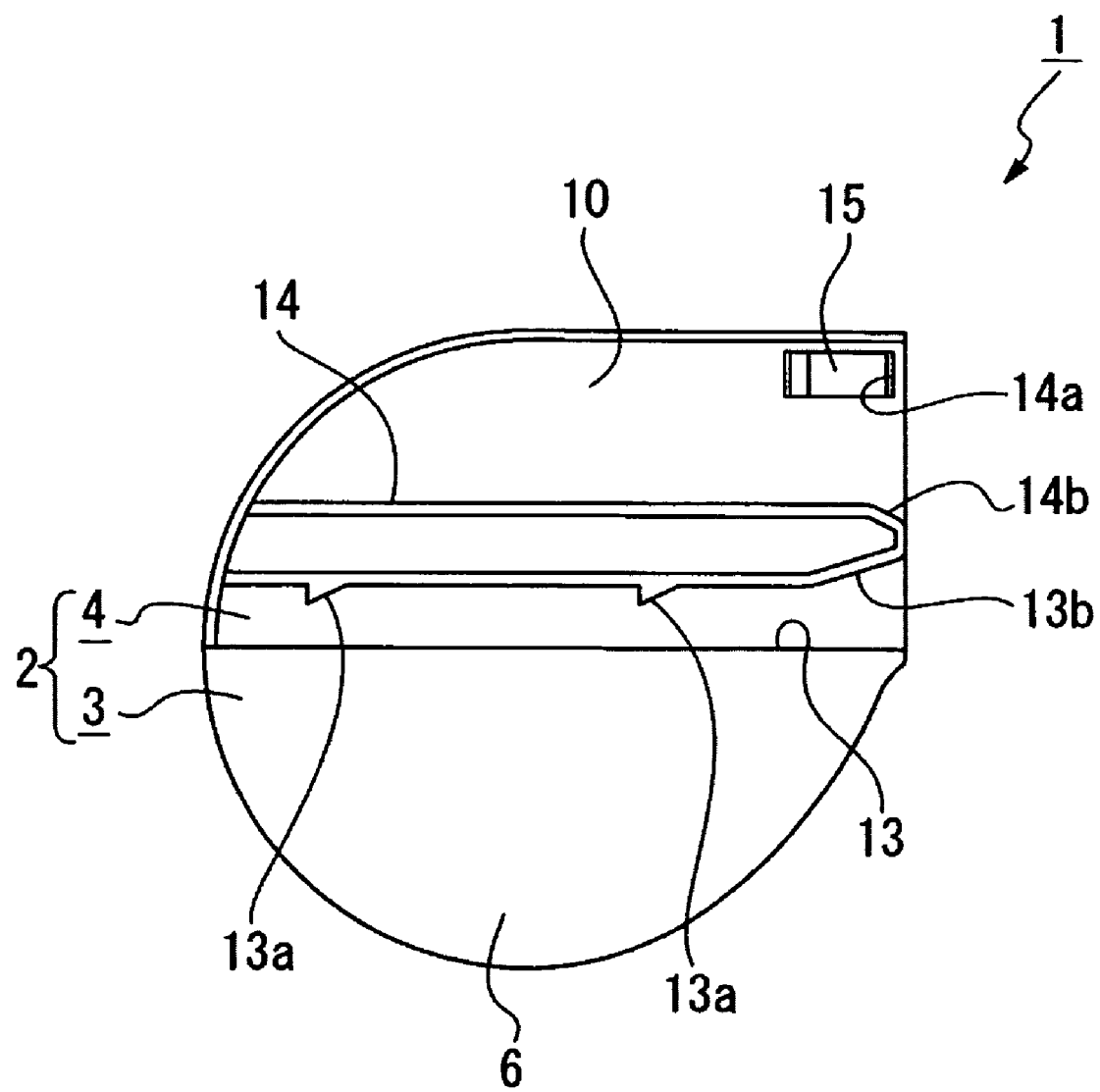
FIG. 7 is an enlarged lateral view of the battery pack.
Figure 8:
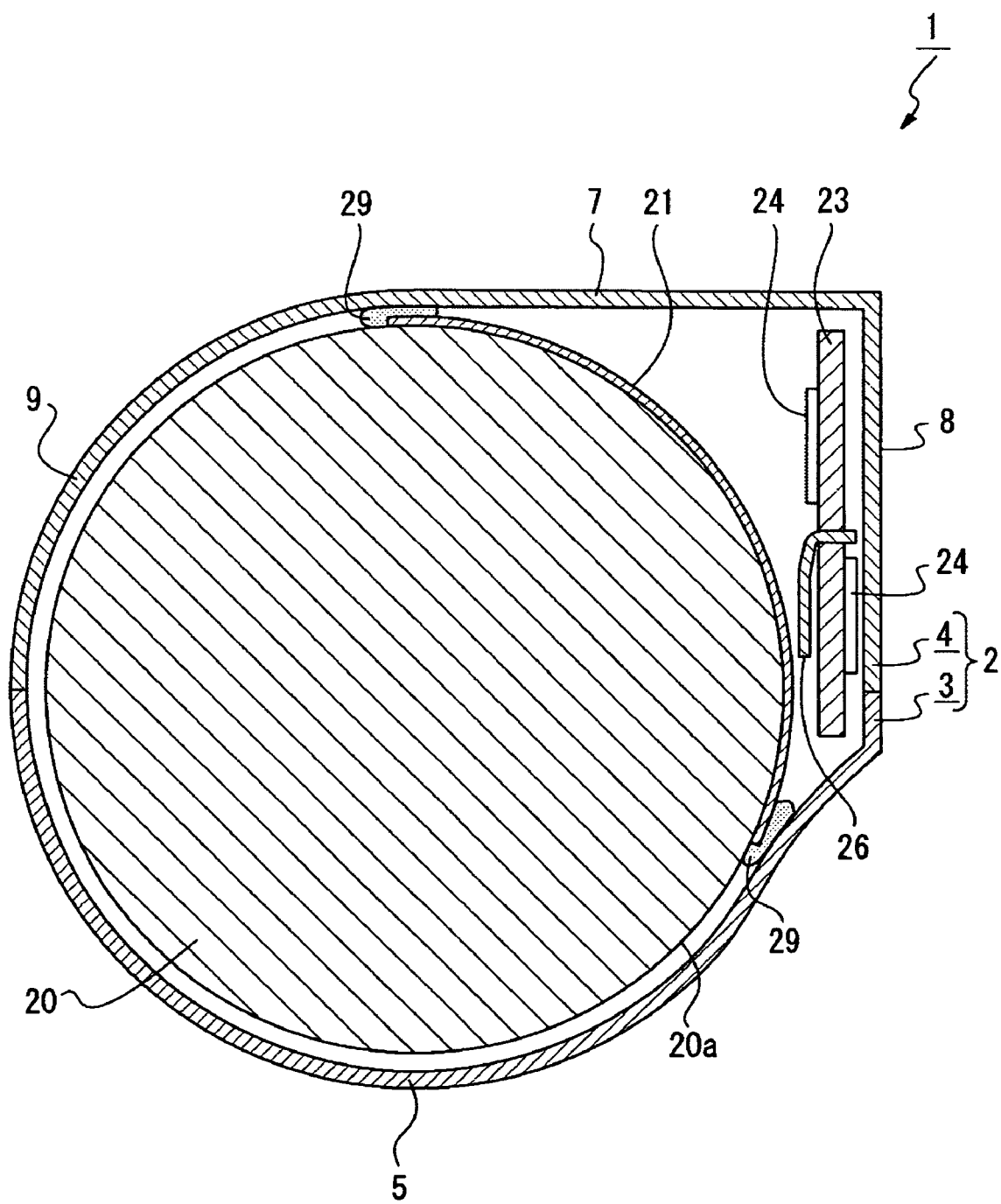
FIG. 8 is an enlarged cross-sectional view taken along line VIII-VIII in FIG. 4.

Referring to FIGS. 2C and 7, the outer side of each side surface 10 has a long-groove-like guided portion 13 extending towards the front and rear of the electronic apparatus 100. Each guided portion 13 has an opening at its front end, and has slide protrusions 13a along the upper side of the guided portion 13. The slide protrusions 13a are projected downward and are separated by a predetermined distance. The front end of each guided portion 13 has an insertion portion 13b which is inclined towards the upper surface 7, such that the opening of the guided portion 13 becomes larger in proportion to the incline of the insertion portion 13b.

Furthermore, the outer side of each side surface 10 also has a long insertion groove 14 which is disposed above the corresponding guided portion 13 and extends towards the front and rear of the electronic apparatus 100. Each insertion groove 14 has an opening at its front end. Referring to FIGS. 6 and 7, adjacent to the front end of each insertion groove 14, a communication hole 14a is provided. Each communication hole 14a communicates with the interior of the casing 2. Furthermore, as shown in FIG. 7, the front end of each insertion groove 14 has an insertion portion 14b which is inclined away from the upper surface 7, such that the opening of the insertion groove 14 becomes larger in proportion to the incline of the insertion portion 14b.

Referring to FIG. 6, the second casing component 4 includes two lock members 15 at the respective left and right ends of the second casing component 4. Each lock member 15 is supported by one of the left and right ends of the second casing component 4 in a movable manner in the horizontal direction in FIG. 6. Each lock member 15 includes a main body 16, a supporting shaft 17 projected horizontally from the main body 16, and an operating part 18 projected upward from the main body 16. Here, the term "upward" refers to a direction towards the viewer in FIG. 6. The main body 16 has a stopper surface 16a facing towards the rear of the electronic apparatus 100, i.e. the downward direction in FIG. 6; and a sloping surface 16b which is inclined towards the front surface 8 and the corresponding supporting shaft 17.

Each supporting shaft 17 supports a coil spring 19. Each coil spring 19 is capable of being expanded and contracted between the main body 16 of the corresponding lock member 15 and the corresponding set of the supporting protrusions 12.

The main body 16 of each lock member 15 is supported between the front surface 8 of the second casing component 4 and the corresponding guide protrusion 11. Moreover, each lock member 15 is movable in the lateral direction, that is, a direction along which the supporting shaft 17 is supported between the two supporting protrusions 12 of the corresponding set. This direction is indicated by an arrow H in FIG. 6. When the lock members 15 are being supported by the second casing component 4, the lock members 15 are biased away from each other due to the resilient forces of the corresponding coil springs 19. Thus, each main body 16 is partially projected outward through the communication hole 14a of the corresponding side surface 10. In this case, each operating part 18 is set in the corresponding oblong hole 7c of the upper surface 7. Consequently, the two lock members 15 can be moved laterally by shifting the two respective operating parts 18 from the exterior of the battery pack 1. Furthermore, the second casing component 4 is provided with regulators, which are not shown in the drawings, for preventing overprojection of the lock members 15 from the second casing component 4 through the corresponding communication holes 14a.

Referring to FIGS. 3 and 4, the casing 2 contains therein three secondary batteries 20. The secondary batteries 20 are, for example, cylindrical lithium-ion batteries which are connected in series and are disposed inside the casing 2.

An oblong protection sheet 21 is attached to the secondary batteries 20. The protection sheet 21 is preferably formed of a material that is flame-retardant, electrolyte-endurable, water-repellent, thermal-conductive, and easy-to-process. For example, the protection sheet 21 may be a resin material such as a polyphenylether (PPE) resin.

The protection sheet 21 is attached to the secondary batteries 20 in a manner such that the longitudinal direction of the protection sheet 21 is aligned with that of the three secondary batteries 20. Thus, the protection sheet 21 partially covers three periphery surfaces 20a of the respective secondary batteries 20. Furthermore, the protection sheet 21 is provided with four insertion holes 21a which are separated by a predetermined distance in the longitudinal direction of the protection sheet 21.

The left and right ends of the protection sheet 21 are respectively provided with two absorptive sheets 22. In detail, the absorptive sheets 22 are attached to a side of the protection sheet 21 opposite to the side to which the secondary batteries 20 are attached. The absorptive sheets 22 may be formed of a highly-absorptive material that is flame-retardant, such as a non-woven fabric.

The casing 2 further contains a control circuit-board 23 at a position across the protection sheet 21 from the secondary batteries 20, such that the protection sheet 21 intervenes the control circuit-board 23 and the secondary batteries 20.

The external dimension of the control circuit-board 23 having a horizontally-oblong structure is smaller than that of the protection sheet 21. Both surfaces of the control circuit-board 23 are provided with electronic components 24. For this reason, a predetermined space for the electronic components 24 must be provided between the control circuit-board 23 and the protection sheet 21, and between the control circuit-board 23 and the inner surface of the casing 2 facing the control circuit-board 23.

The control circuit-board 23 includes a circuit for charging and discharging the secondary batteries 20. The circuit, for example, detects the voltage and current values of the secondary batteries 20, and performs a protective operation for the secondary batteries 20 in a case where an overcharge value or an over-discharge value is detected.

A connector 25 is disposed adjacent to one end of the control circuit-board 23 and can be connected with the plug connector 105 of the electronic apparatus 100. Furthermore, the control circuit-board 23 is provided with four attachment holes 23a which are separated by a predetermined distance in the longitudinal direction of the control circuit-board 23 and correspond to the four respective insertion holes 21a of the protection sheet 21.

The surface of the control circuit-board 23 facing the protection sheet 21 is provided with a thermistor 26 for detecting the surface temperature of the secondary batteries 20. Accordingly, referring to FIG. 8, the thermistor 26 is disposed between the protection sheet 21 and the control circuit-board 23.

As mentioned above, since the protection sheet 21 is formed of a high thermal-conductive material, the thermistor 26 can properly detect the surface temperature of the secondary batteries 20 even if the thermistor 26 is disposed between the protection sheet 21 and the control circuit-board 23.

Accordingly, by using a high thermal-conductive material for the protection sheet 21 and disposing the thermistor 26 in the predetermined space provided for the electronic components 24 between the protection sheet 21 and the control circuit-board 23, a designated space for the thermistor 26 is not necessary. This contributes to the compactness of the battery pack 1 without deteriorating the functionality of the thermistor 26.

Furthermore, due to the high thermal-conductive material used for the protection sheet 21, designated holes for conducting heat from the secondary batteries 20 to the thermistor 26 are not required in the protection sheet 21. Accordingly, this prevents the electrolyte, which can possibly leak from the secondary batteries 20, from entering the control circuit-board 23.

Electrode sections of the control circuit-board 23 are connected with corresponding electrodes of the secondary batteries 20, i.e. positive electrodes and negative electrodes, via a plurality of tabs 27. Each of the tabs 27 is bent into a predetermined shape, and has a first terminal 27a which is inserted through the corresponding insertion hole 21a and attachment hole 23a. The inserted first terminal 27a is joined to the corresponding electrode section in the control circuit-board 23 by, for example, soldering. On the other hand, second terminals 27b provided in the tabs 27 are, for example, welded to the electrodes of the secondary batteries 20.

Figure 9:
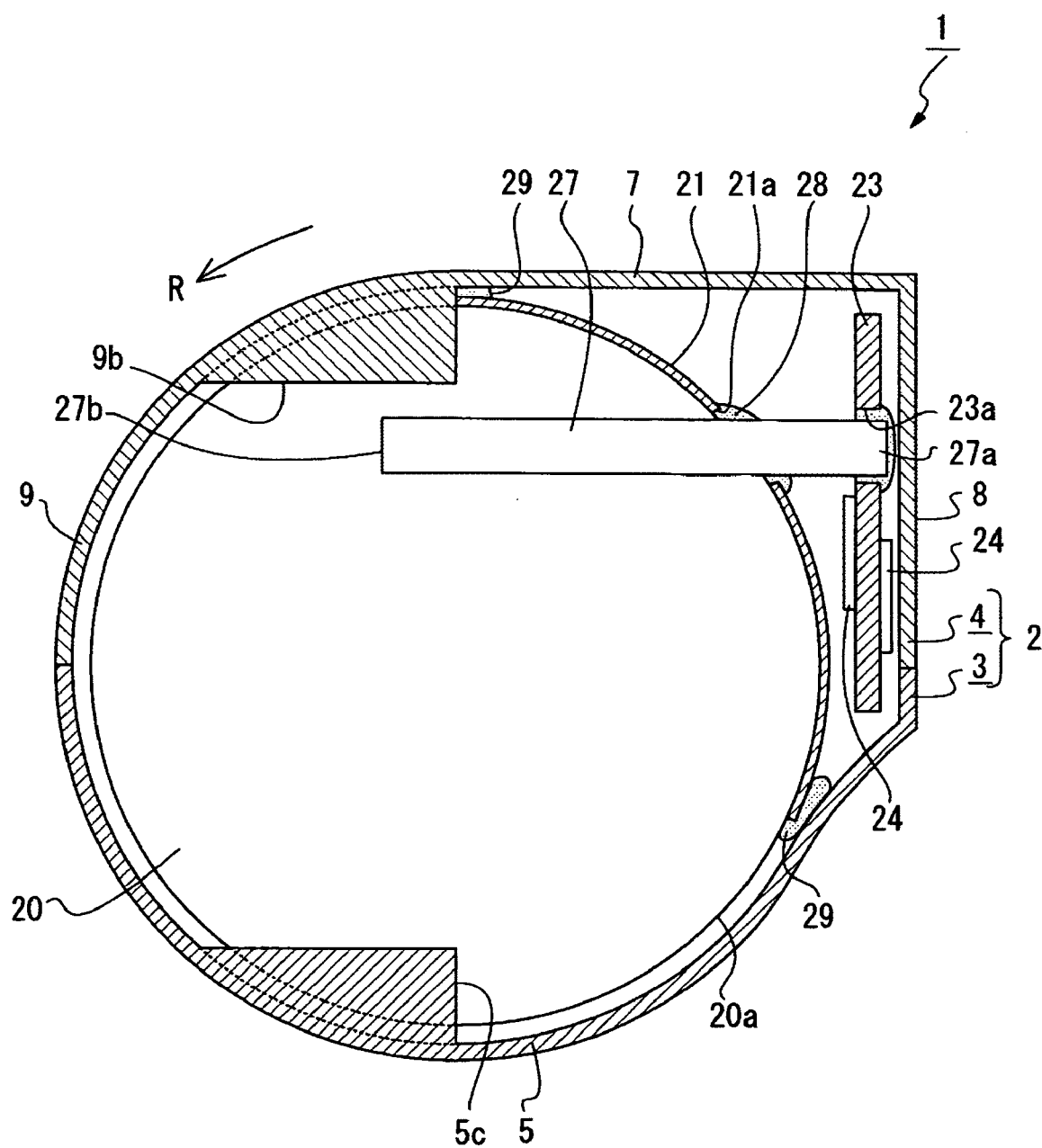
FIG. 9 is an enlarged cross-sectional view taken along line IX-IX in FIG. 4.

FIG. 9 illustrates a state where one of the electrode sections of the control circuit-board 23 and the corresponding electrode of one of the secondary batteries 20 are connected to each other via the corresponding tab 27. In this state, an adhesive sealant 28 is applied to an insertion portion between each insertion hole 21a of the protection sheet 21 and the corresponding tab 27. Thus, each adhesive sealant 28 blocks the space between the corresponding insertion hole 21a and tab 27. For the adhesive sealants 28, a silyl-group-containing polymer adhesive, such as product 2430D produced by Three Bond Co., Ltd., is preferably used. Such an adhesive hardens by reacting to a fine amount of liquid, such as an electrolyte.

Accordingly, if the electrolyte leaks from the secondary batteries 20, the electrolyte is prevented from reaching the control circuit-board 23 via the insertion holes 21a, meaning that the electrolyte is prevented from adhering to the control circuit-board 23.

The assembly process of the battery pack 1 will now be described. The battery pack 1 is formed by storing, for example, the secondary batteries 20 in the casing 2.

As described previously, the electrodes of the secondary batteries 20 and the electrode sections of the control circuit-board 23 are connected via the tabs 27. While maintaining this connected state, the secondary batteries 20 and the control circuit-board 23 are first set in the second casing component 4 of the casing 2.

Referring to FIG. 9, adhesive sealants 29 are applied to the upper and lower edges of the protection sheet 21, that is, to the two opposite edges extending in the longitudinal direction and between which sections of the periphery surfaces 20a of the secondary batteries 20 are covered. One of the adhesive sealants 29 blocks the space between the upper edge of the protection sheet 21 and the inner surface of the second casing component 4. Consequently, the entire protection sheet 21 is bent into a curved-shape and is fixed to the secondary batteries 20 and the second casing component 4 while being tightly attached to the periphery surfaces 20a of the secondary batteries 20.

Similar to the adhesive sealants 28, the adhesive sealants 29 are preferably a silyl-group-containing polymer adhesive that hardens by reacting to a fine amount of liquid, such as an electrolyte.

As described above, for assembling the battery pack 1, when the secondary batteries 20 are set in the second casing component 4, the mounting of the protection sheet 21, the secondary batteries 20, and the second casing component 4 are simultaneously performed. This improves the efficiency of the assembly process for the battery pack 1.

When setting the secondary batteries 20 in the second casing component 4, the positioning ribs 9b on the second casing component 4 are set in spaces between adjacent secondary batteries 20.

This means that the longitudinal positioning of the secondary batteries 20 can be performed with respect to the second casing component 4 when the secondary batteries 20 are set in the second casing component 4. Thus, the efficiency of the assembly process for the battery pack 1 is further improved.

Referring to FIG. 9, in this state where the positioning ribs 9b are set in spaces between adjacent secondary batteries 20, the secondary batteries 20 are rotated in a direction indicated by an arrow R with respect to the second casing component 4. By rotating the secondary batteries 20 in the direction of the arrow R, the upper edge of the protection sheet 21 comes into contact with the positioning ribs 9b.

Accordingly, because the upper edge of the protection sheet 21 comes into contact with the positioning ribs 9b, the positioning of the secondary batteries 20 in the circumferential direction is performed with respect to the second casing component 4. This further improves the efficiency of the assembly process for the battery pack 1.

Figure 10:
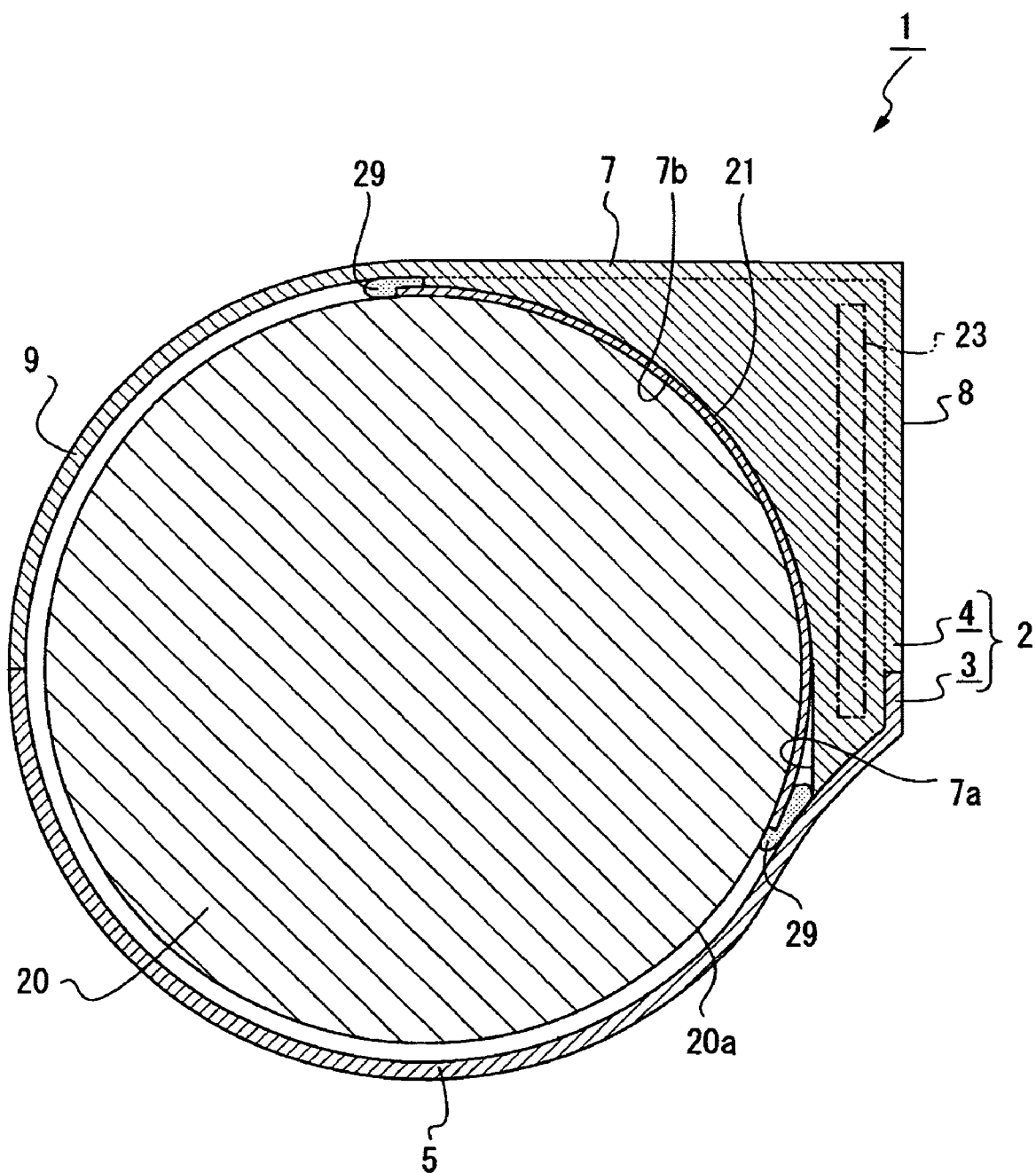
FIG. 10 is an enlarged cross-sectional view taken along line X-X in FIG. 4.

In this state where the secondary batteries 20 and the control circuit-board 23 are disposed in the second casing component 4, the connector 25 in the control circuit-board 23 is set in the connector-opening 8b of the second casing component 4. Referring to FIG. 10, left and right sections of the protection sheet 21, namely, two inner sections adjacent to the respective absorptive sheets 22, are set in a manner such that the left and right sections are respectively in contact with the two arc segments 7b of the stopper ribs 7a.

Subsequently, the first casing component 3 and the second casing component 4 are joined together while covering the secondary batteries 20.

For joining the first casing component 3 with the second casing component 4, the engagement tabs 5a of the first casing component 3 are engaged with the corresponding engagement tabs 8a of the second casing component 4, and moreover, the engagement tabs 5b of the first casing component 3 are engaged with the corresponding engagement tabs 9a of the second casing component 4. Furthermore, the engagement protrusions 6a of the first casing component 3 are also engaged with the corresponding engagement tabs 10a of the second casing component 4.

Here, referring to FIG. 9, since one of the adhesive sealants 29 is applied to a section between the lower edge of the protection sheet 21 and the periphery surfaces 20a of the secondary batteries 20, the adhesive sealant 29 blocks the space between the lower edge of the protection sheet 21 and the inner surface of the first casing component 3. Accordingly, the protection sheet 21 is fixed to the secondary batteries 20 and the first casing component 3, and the assembly process for the battery pack 1 is completed.

This implies that the protection sheet 21, the secondary batteries 20, and the first casing component 3 are simultaneously fixed to one another when the second casing component 4 is being joined with the first casing component 3. Thus, the efficiency of the assembly process for the battery pack 1 is further improved.

When joining the first casing component 3 with the second casing component 4, the positioning ribs 5c in the first casing component 3 are set in spaces between adjacent secondary batteries 20.

Consequently, the longitudinal positioning of the secondary batteries 20 can be performed with respect to the first casing component 3 when the first casing component 3 is being joined to the second casing component 4. This further improves the efficiency of the assembly process for the battery pack 1.

Figure 11:
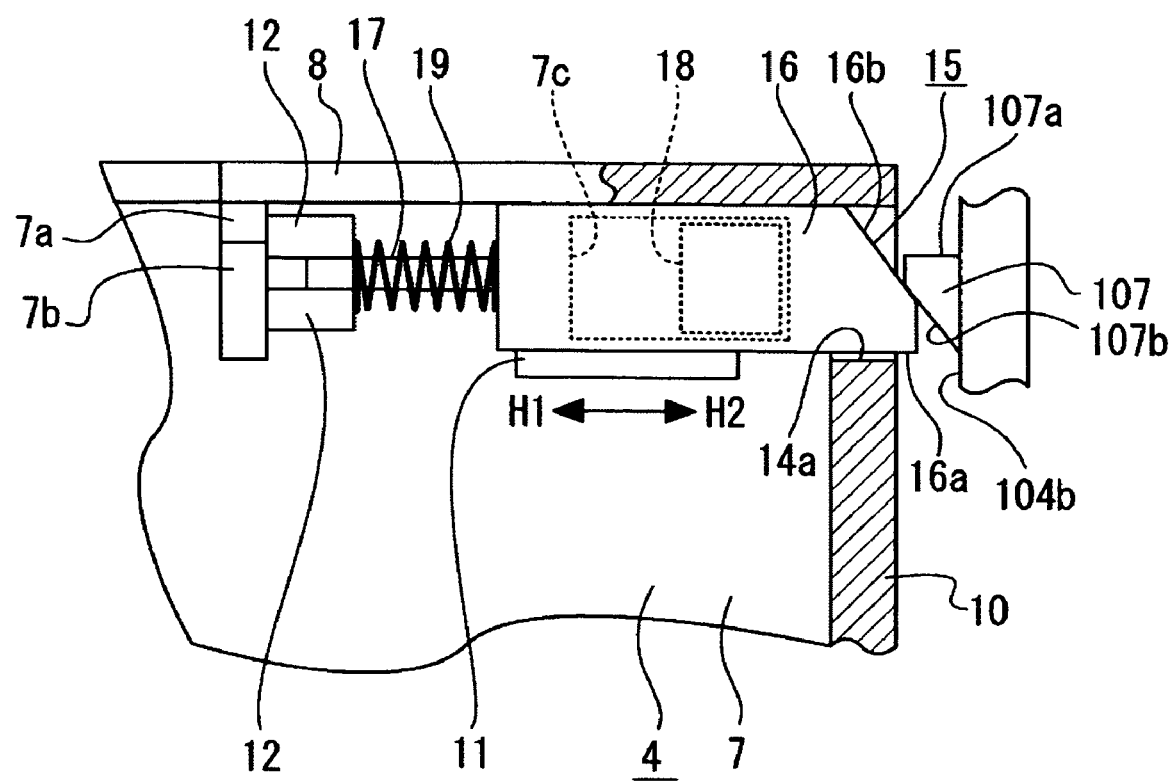
FIG. 11 is an enlarged cross-sectional bottom view illustrating a state where the battery pack is being engaged to the battery holder.
Figure 12:
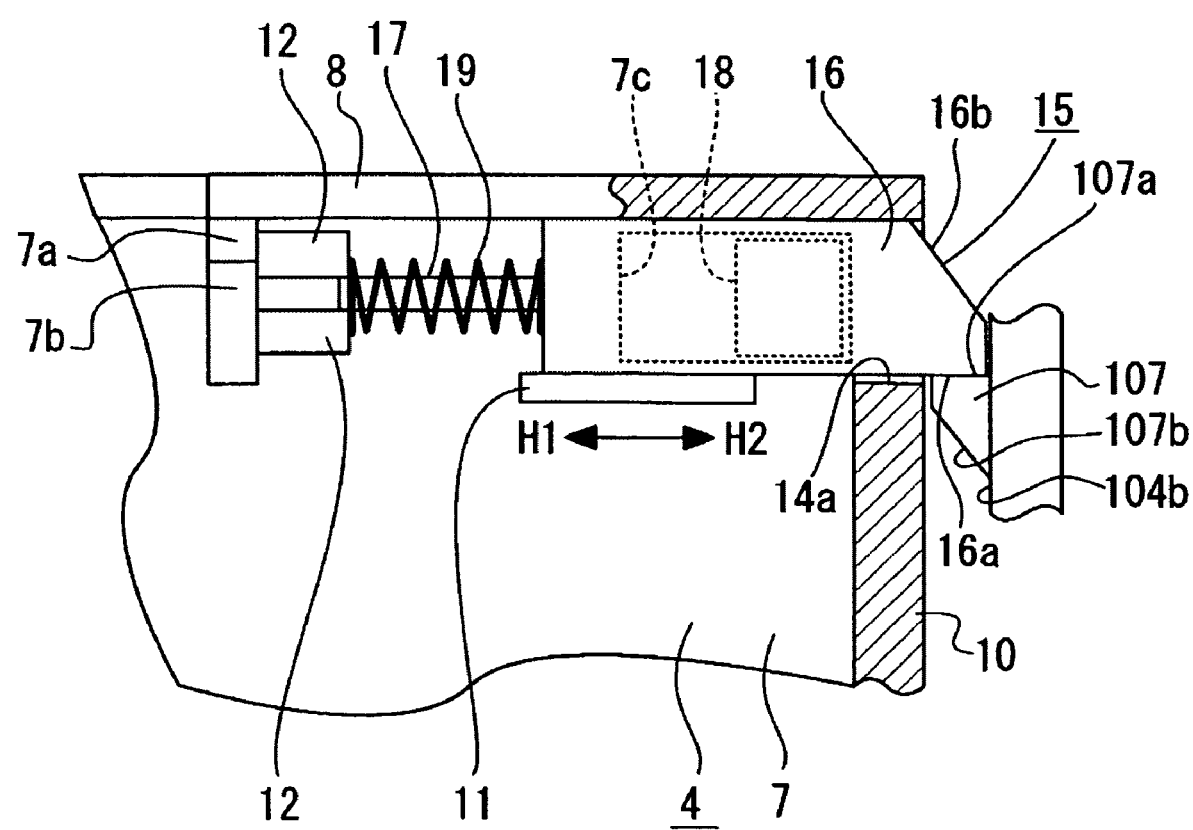
FIG. 12 is an enlarged cross-sectional bottom view illustrating a state where the battery pack is engaged with and locked in the battery holder.

Referring to FIGS. 11 and 12, the process for installing the battery pack 1 in the battery holder 104 of the main-body unit 102 will now be described.

First, referring to FIGS. 2A, 2B, 2C, and 7, when the battery pack 1 is engaged to the battery holder 104, the two guiding portions 106 on the main-body unit 102 respectively become engaged with the two guided portions 13 in the battery pack 1, and the two locking portions 107 on the main-body unit 102 respectively become engaged with the two insertion grooves 14 in the battery pack 1. Since the insertion portions 13b provide wide openings for the guided portions 13, the corresponding guiding portions 106 can be smoothly engaged with the guided portions 13. Similarly, since the insertion portions 14b provide wide openings for the insertion grooves 14, the corresponding locking portions 107 can be smoothly engaged with the insertion grooves 14.

When the guiding portions 106 are being engaged to the guided portions 13, the guiding portions 106 slide on the corresponding slide protrusions 13a. Thus, the contact area between the guiding portions 106 and the guided portions 13 is reduced so as to achieve a smooth engagement of the battery pack 1.

On the other hand, referring to FIG. 11, when the locking portions 107 are being engaged to the insertion grooves 14, the sloping surfaces 107b of the locking portions 107 slide on the corresponding sloping surfaces 16b of the lock members 15. Each of the lock members 15 is shifted inward in a direction indicated by an arrow H1 in FIG. 11 and thus moves against the resilient force of the corresponding coil spring 19.

Subsequently, referring to FIG. 12, the locking portions 107 are inserted further into the insertion grooves 14, and at a point where the stopper surfaces 107a of the locking portions 107 pass the corresponding main bodies 16 of the lock members 15, each of the lock members 15 is shifted outward in a direction indicated by an arrow H2 due to the resilient force of the corresponding coil spring 19. Thus, the stopper surfaces 107a and the stopper surfaces 16a of the lock members 15 become engaged, such that the battery pack 1 becomes locked into the battery holder 104. Accordingly, this completes the process for installing the battery pack 1 in the battery holder 104. In this state where the battery pack 1 is engaged with the battery holder 104, the connector 25 in the battery pack 1 is connected with the plug connector 105 in the main-body unit 102.

For uninstalling the battery pack 1 from the battery holder 104, the operating parts 18 of the lock members 15 are shifted such that each of the lock members 15 is moved inward in the direction of the arrow H1. This disengages the stopper surfaces 16a from the stopper surfaces 107a. Thus, the battery pack 1 can be uninstalled by pulling the battery pack 1 out of the battery holder 104.

According to the above description, in the battery pack 1, the external dimension of the protection sheet 21 is greater than that of the control circuit-board 23, and the control circuit-board 23 is disposed across from the secondary batteries 20 while having the protection sheet 21 disposed therebetween.

Accordingly, the protection sheet 21 prevents the electrolyte, which can possibly leak from the secondary batteries 20, from entering the control circuit-board 23. Thus, an additional barrier wall, which may be disposed between the secondary batteries 20 and the control circuit-board 23, for preventing a leaking electrolyte from entering the control circuit-board 23 is not necessary. This contributes to the compactness of the battery pack 1 without sacrificing the ability to prevent the electrolyte from adhering to the control circuit-board 23.

Furthermore, in comparison with conventional battery packs in which a barrier wall is required inside the casing, since the battery pack 1 of the present invention does not require such barrier walls, the present invention provides simpler molding conditions for fabricating the casing 2. Moreover, the present invention prevents molding errors caused by, for example, weld marks and sink marks, as is often the case when a barrier wall is provided.

Furthermore, since a barrier wall is not integrally disposed in the casing, the battery pack 1 is prevented from, for example, cracking and breaking of a barrier wall which may be caused by dropping or vibration of the battery pack 1. Accordingly, this ensures the prevention of the electrolyte from entering the control circuit-board 23.

As described previously, according to the battery pack 1, the two opposite edges of the protection sheet 21 extending in the longitudinal direction are provided with the adhesive sealants 29 for blocking the spaces between the inner surface of the casing 2 and the two edges of the protection sheet 21. Consequently, the electrolyte from the secondary batteries 20 is prevented from entering the control circuit-board 23, thus further preventing the electrolyte from adhering to the control circuit-board 23.

Furthermore, according to the battery pack 1, the two opposite ends of the protection sheet 21 with respect to the longitudinal direction are respectively provided with the two absorptive sheets 22 for absorbing an electrolyte. Consequently, the electrolyte traveling towards the control circuit-board 23 around the two opposite ends of the secondary batteries 20 is absorbed by the two absorptive sheets 22. This further prevents the electrolyte from adhering to the control circuit-board 23.

Furthermore, in the battery pack 1, since the stopper ribs 7a are provided in the second casing component 4 of the casing 2, the electrolyte leaking from the secondary batteries 20 is blocked by the stopper ribs 7a. Accordingly, this further prevents the electrolyte from adhering to the control circuit-board 23.

Although the two opposite edges of the protection sheet 21 extending in the longitudinal direction are provided with the adhesive sealants 29 in the above embodiment, the protection sheet 21 may alternatively be longer further in the sideways direction, such that the left and right ends may also be provided with sealants. In this case, the additional sealants block the spaces between the left and right ends and the inner sides of the side surfaces 6, and between the left and right ends and the inner sides of the side surfaces 10. This may further prevent the electrolyte from adhering to the control circuit-board 23.

Furthermore, although the two absorptive sheets 22 are respectively disposed adjacent to the left and right ends of the protection sheet 21 in the above embodiment, an alternative absorptive sheet may be disposed entirely around the periphery of the protection sheet 21 so as to improve the absorbability of the electrolyte.

Furthermore, since the battery pack 1 is provided with the guided portions 13, which are guided by the guiding portions 106 of the main-body unit 102 when the battery pack 1 is installed in the battery holder 104, the engagement of the battery pack 1 to the battery holder 104 can be smoothly and properly performed.

Moreover, since the battery pack 1 is provided with the lock members 15, which are locked into the locking portions 107 of the main-body unit 102 when the battery pack 1 is installed in the battery holder 104, the battery pack 1 is prevented from falling off the battery holder 104.

The illustrated shape and structure of each element in the above embodiment are merely examples of the present invention, and are thus not limited to such shape and structure. A variety of modifications may be made without departing from the scope of the present invention.

What is claimed is:

1. A battery pack, comprising:
   a casing formed of an insulative material;
   at least one secondary battery disposed inside the casing, said at least one secondary battery being cylindrical;
   a control circuit-board disposed inside the casing and provided to charge and discharge said at least one secondary battery;
   a protection sheet formed of an insulative material and disposed inside the casing, the protection sheet being adapted to a cylindrical contour of the at least one secondary battery such that the protection sheet does not extend entirely around a circumferential direction of the cylindrical contour of the at least one secondary battery, and a first longitudinal edge and a second longitudinal edge of the protection sheet extend in a longitudinal direction transverse to the circumferential direction and are attached with a sealant to an outer surface of said at least one secondary battery along a longitudinal direction of the battery;
   a positioning rib in contact with one of the longitudinal edges of the protection sheet to set the protection sheet at a predetermined position with respect to the casing,
   wherein the control circuit-board is disposed across from said at least one secondary battery while the protection sheet is disposed therebetween.

2. The battery pack according to claim 1, wherein the sealant attached to the first longitudinal edge blocks a space between the first longitudinal edge and an inner surface of the casing, and the sealant attached to the second longitudinal edge blocks a space between the second longitudinal edge and the inner surface of the casing.

3. The battery pack according to claim 2, wherein the sealant comprises adhesive and attaches the protection sheet, said at least one secondary battery, and the inner surface of the casing together.

4. The battery pack according to claim 1, wherein the casing includes a stopper rib to block an electrolyte leaking from an interior of said at least one secondary battery so as to prevent the electrolyte from reaching the control circuit-board.

5. The battery pack according to claim 1, further comprising:
   a thermistor which is connected with the control circuit-board and detects a surface temperature of said at least one secondary battery,
   wherein the protection sheet is formed of a thermal-conductive material, and
   wherein the thermistor is disposed between the control circuit-board and the protection sheet.

6. The battery pack according to claim 1, wherein an inner surface of the casing is provided with a plurality of the positioning ribs which contact at least one of the longitudinal edges of the protection sheet such that the protection sheet is set at the predetermined position with respect to the elongated casing.

7. The battery pack according to claim 6, wherein said at least one secondary battery comprises a plurality of secondary batteries which are connected in series and are disposed inside the casing, and
   wherein each positioning rib of the plurality of positioning ribs is set in a space between adjacent secondary batteries so as to set the secondary batteries at predetermined positions with respect to the casing.

8. The battery pack according to claim 1, wherein the battery pack is capable of being installed in a battery holder which is provided in an electronic apparatus and has a guiding portion, and
   wherein the battery pack further comprises a guided portion which is guided by the guiding portion when the battery pack is engaged with the battery holder.

9. The battery pack according to claim 1, wherein the battery pack is capable of being installed in a battery holder which is provided in an electronic apparatus and has a locking portion, and
   wherein the battery pack further comprises a lock member which is locked in the locking portion when the battery pack is engaged with the battery holder.

10. The battery pack according to claim 9, wherein a portion of the lock member is configured to extend from the casing in a first position and configured to retract inside the casing in a second position and the portion of the lock member extends in a longitudinal direction from the battery pack.

11. The battery pack according to claim 9, wherein a portion of the lock member is configured to extend from the casing in a first position and configured to retract inside the casing in a second position and the lock member includes a spring to bias the portion of the lock member to extend from the battery pack.

12. The battery pack according to claim 9, wherein a portion of the lock member is configured to extend from the casing in a first position and configured to retract inside the casing in a second position and the portion of the lock member extends in a direction perpendicular to a direction of installation of the battery pack into the battery holder.

13. The battery pack according to claim 9, wherein a portion of the lock member is configured to extend from the casing in a first position and configured to retract inside the casing in a second position and the portion of the lock member includes a stopper surface configured to abut a stopper surface of the locking portion of the battery holder to lock the battery pack into the battery holder.

14. The battery pack according to claim 1, wherein at least two opposite ends of the protection sheet with respect to the longitudinal direction are each provided with an absorptive sheet to absorb an electrolyte leaking from an interior of said at least one secondary battery.

15. A battery pack, comprising:
   an elongated casing formed of an insulative material;
   at least one secondary battery disposed inside the elongated casing in a single, elongated column, said at least one secondary battery being cylindrical;
   a control circuit-board disposed inside the elongated casing and provided to charge and discharge said at least one secondary battery;
   a protection sheet formed of an insulative material and disposed inside the elongated casing, the protection sheet being adapted to a cylindrical contour of the at least one secondary battery such that the protection sheet does not extend entirely around a circumferential direction of the cylindrical contour of the at least one secondary battery, and a first longitudinal edge and a second longitudinal edge of the protection sheet extend in a longitudinal direction transverse to the circumferential direction and are attached with a sealant to an outer surface of said at least one secondary battery along a longitudinal direction of the battery;

a positioning rib in contact with one of the longitudinal edges of the protection sheet to set the protection sheet at a predetermined position with respect to the casing, wherein the control circuit-board is disposed across from said at least one secondary battery while the protection sheet is disposed therebetween.

16. The battery pack according to claim 15, wherein
the battery pack is configured to be installed in a battery holder which is provided in an electronic apparatus and has a locking portion, the battery pack further comprises a lock member which is locked in the locking portion when the battery pack is engaged with the battery holder, and a portion of the lock member includes a stopper surface configured to abut a stopper surface of the locking portion of the battery holder to lock the battery pack into the battery holder.

17. The battery pack according to claim 15, wherein at least two opposite ends of the protection sheet with respect to the longitudinal direction are each provided with an absorptive sheet to absorb an electrolyte leaking from an interior of said at least one secondary battery.

18. The battery pack according to claim 15, wherein
the battery pack is configured to be installed in a battery holder which is provided in an electronic apparatus and has a locking portion, the battery pack further comprises a lock member which is locked in the locking portion when the battery pack is engaged with the battery holder, and a portion of the lock member extends in a direction perpendicular to a direction of installation of the battery pack into the battery holder.

19. The battery pack according to claim 18, wherein the portion of the lock member extends in a longitudinal direction from the battery pack.

20. The battery pack according to claim 18, wherein the lock member includes a spring to bias the portion of the lock member to extend from the battery pack.

* * * * *